(12) United States Patent
Sachtleben

(10) Patent No.: US 11,666,173 B2
(45) Date of Patent: Jun. 6, 2023

(54) DEVICE FOR PREPARING COFFEE

(71) Applicant: Melitta Europa GmbH & Co. KG, Minden (DE)

(72) Inventor: Andreas Sachtleben, Minden (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 398 days.

(21) Appl. No.: 16/930,528

(22) Filed: Jul. 16, 2020

(65) Prior Publication Data

US 2021/0015293 A1    Jan. 21, 2021

(30) Foreign Application Priority Data

Jul. 16, 2019  (DE) .......................... 202019103927.2

(51) Int. Cl.
*A47J 31/06*    (2006.01)
*A47J 31/44*    (2006.01)
*A47J 31/46*    (2006.01)

(52) U.S. Cl.
CPC ....... *A47J 31/0605* (2013.01); *A47J 31/0615* (2013.01); *A47J 31/0663* (2013.01); *A47J 31/446* (2013.01); *A47J 31/461* (2018.08); *A47J 31/0636* (2013.01)

(58) Field of Classification Search
CPC ............... A47J 31/0605; A47J 31/0615; A47J 31/0621; A47J 31/0636; A47J 31/08; A47J 31/461
USPC ........................................... 99/283, 299, 322
See application file for complete search history.

(56) References Cited

U.S. PATENT DOCUMENTS

| 5,085,135 A * | 2/1992 | Collignon ............... A47J 31/06 251/95 |
| 5,669,287 A * | 9/1997 | Jefferson, Jr. ......... A47J 31/002 99/302 R |
| 2014/0366741 A1* | 12/2014 | Huang ................ A47J 31/0615 99/280 |

FOREIGN PATENT DOCUMENTS

| DE | 2042946 A1 | 3/1971 | |
| DE | 2625650 A1 | 12/1977 | |
| DE | 2821996 A1 * | 11/1979 | ......... A47J 31/0605 |
| DE | 3512920 A1 * | 1/1986 | ......... A47J 31/0605 |
| DE | 69410524 T2 | 11/1998 | |
| DE | 202016002518 U1 | 5/2016 | |
| DE | 202017100295 U1 | 1/2017 | |
| DE | 202018106577 U1 | 11/2018 | |

(Continued)

OTHER PUBLICATIONS

European Search Report in corresponding European Patent Application No. 3766391, dated Dec. 1, 2020, 4 pages with Google English Translation.

(Continued)

*Primary Examiner* — Reginald Alexander
(74) *Attorney, Agent, or Firm* — FisherBroyles, LLP; Robert Kinberg

(57) ABSTRACT

A device for preparing coffee by manual brewing includes: a filter holder for receiving a filter insert with ground coffee; a holder in which the filter holder is inserted; a vessel arranged under the filter holder into which the brewed coffee can be filled; a drain arranged on the filter holder; and a closure element arranged on the drain for opening and closing the drain. An actuating element for the closure element is provided on the filter holder by which the closure element can be moved between an open position and a closed position independently of the vessel.

12 Claims, 8 Drawing Sheets

(56) References Cited

FOREIGN PATENT DOCUMENTS

| | | |
|---|---|---|
| DE | 102018113016 A1 | 12/2019 |
| EP | 0111969 A1 | 6/1984 |
| EP | 2641516 B1 | 9/2013 |
| EP | 2700337 B1 | 2/2014 |
| EP | 3289935 A1 | 3/2018 |

OTHER PUBLICATIONS

German Search Report in corresponding German Patent Application No. 20 2019 103 927.2, dated Feb. 5, 2020, 12 pages with Google translation into English.

* cited by examiner

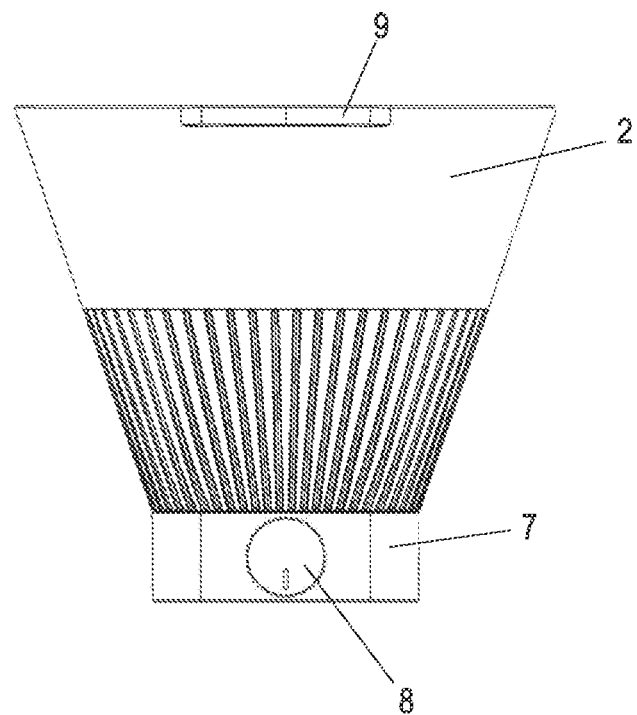

DEVICE FOR PREPARING COFFEE

CROSS-REFERENCE TO RELATED APPLICATIONS

This application claims priority to German Patent Application No. 20 2019 103 927.2 filed Jul. 16, 2019, the entire contents of which is incorporated herein by reference.

FIELD OF THE INVENTION

The present invention relates to a device for preparing coffee, in particular by manual brewing, comprising a filter holder for receiving a filter insert with ground coffee, a holder in which the filter holder is inserted, a vessel arranged under the filter holder into which the brewed coffee can be filled, a drain arranged on the filter holder, and a closure element arranged on the drain for opening and closing the drain.

BACKGROUND

For automatic coffee machines a filter holder is known from EP 2 700 337 B1, which has a closing valve at one outlet. When a container, such as a glass jug, is placed in the coffee machine, a lid on the container moves the valve upwards via a lever, so that the valve is opened. Such valves are designed to prevent dripping after the container has been removed.

For manual preparation of coffee, European patent document EP 3 289 935 A1 discloses a filter vessel in which coffee can be poured into a container via two spaced outlet openings. The drain openings cannot be closed, and after coffee has been brewed, the filter receptacle must therefore be placed on another receptacle to prevent contamination by dripping from the filter receptacle.

German patent document DE 10 2018 113 016 discloses a device for preparing coffee in which a filter vessel can be placed on a support element with a collecting element. To collect the residual liquid from the filter vessel, the filter vessel can be turned relative to the collecting element so that dripping liquid is collected in the collecting vessel. If the user forgets to make the appropriate adjustment, contamination will occur.

SUMMARY

It is therefore an object of the present invention to provide a device for preparing coffee which enables residual liquid to be easily collected on a filter holder.

The above and other objects are achieved by a device for preparing coffee, in particular by manual brewing, which in one embodiment includes: a filter holder for receiving a filter insert with ground coffee; a holder in which the filter holder is inserted; a vessel arranged under the filter holder into which the brewed coffee can be filled; a drain arranged on the filter holder; a closure element arranged on the drain for opening and closing the drain; and an actuating element arranged on the filter holder and connected to move the closure element between an open position and a closed position independently of the vessel.

In the device according to the invention, an actuating element for the closure element is provided on the filter holder, by which the closure element can be moved between an open position and a closed position independently of the vessel. This allows the user to manually switch the actuating element between a closed position and an open position, so that no movement of the entire filter holder is necessary to stop the brewing process and prevent dripping by adjusting the closure element. A movement of the closing element independent of the vessel is to be understood in such a way that the closing element is not moved by means of a vessel or a lid on the vessel, but by a separate actuating element provided in particular on the filter holder or the holder.

In one embodiment at least one valve body can be moved via the actuating element at a drain opening of the drain. The valve body can be moved from a closed position to an open position and back via the actuating element. The actuating element can be mounted on a housing of the filter holder so that it can be slid or pivoted. This makes the actuating element easy to operate. For better recognition of the open and closed position, the closure element can be latched in these two positions. A spring element can be provided for this purpose, by which the closure element is pretensioned in the closed position, so that the spring element supports a latching process.

In another embodiment, the filter holder is provided with two spaced drain openings, which can each be closed by a valve body. It is, of course, also possible to provide only a single drain opening or more than two drain openings, whereby each drain opening can be closed by a valve body. If several drain openings, in particular two drain openings, are provided, a connecting element can be provided on the closing device, by which the valve bodies can be opened and closed simultaneously. In this way it can be ensured via the actuating element that all drain openings are opened or closed at the same time. The connecting element may have a web which can be displaced by the actuating element against the force of a spring element.

In another embodiment, two sleeves are formed integrally with the connecting element for connecting the valve bodies, which are located under the two drain openings on the filter holder, so that when preparing coffee, the coffee can flow down through the sleeves. One valve body can be connected integrally with each sleeve. The valve bodies can be moved together in a vertical direction to move from an open to a closed position and back. The closure means can be guided by guide means, in particular sleeves or sliding elements, which are arranged around the two sleeves.

For ease of operation, the device can have a rotary knob as the actuating element. Markings may be provided on the knob or next to the knob to indicate to the user whether the filter holder is in an open or closed position.

If the actuating element is designed as a rotary knob, an eccentric or a protruding cam may be arranged on an axis of the rotary knob by means of which the locking element can be moved. In this way, a closure element in accordance with the invention can be provided with only a few components.

The holder surrounds the filter holder preferably annularly, whereby at least one elastic support element and additionally or alternatively an elastic support ring for the filter holder can be provided on the holder. This reduces noise development when inserting the filter holder and the filter holder is always centered in the holder in the same way above the vessel. The filter holder can be easily removed from the holder and then cleaned.

The device according to the invention is used in particular for the manual preparation of coffee by the user himself pouring hot water into the filter holder. Optionally, the device can also be used with a coffee machine in which the water supply is automatic.

BRIEF DESCRIPTION OF THE DRAWINGS

The invention is explained in more detail below by means of a design example with reference to the attached drawings, wherein

FIG. 3 shows a front view of the filter holder of the device of FIG. 1;

DETAILED DESCRIPTION

Figure 1:
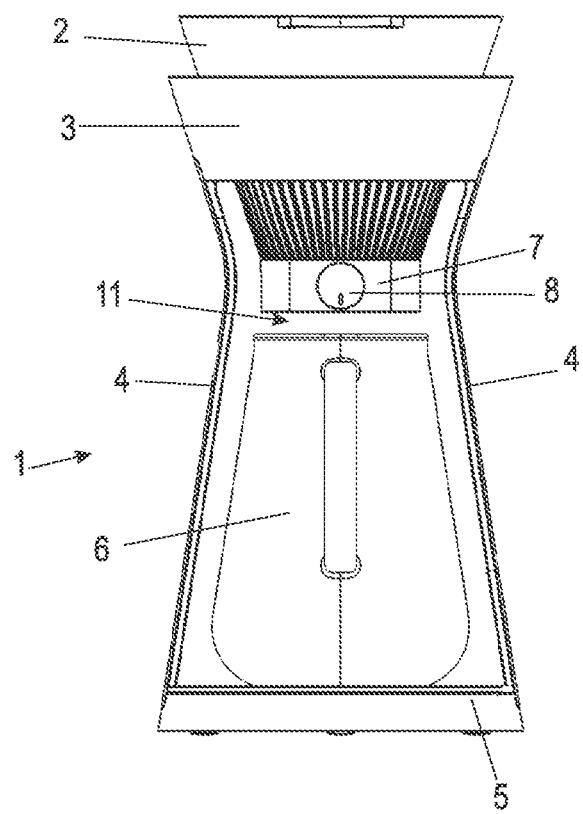
FIG. 1 shows a front view of an apparatus for making coffee according to the invention.

Referring to FIG. 1, there is shown a device 1 for preparing coffee which includes a filter holder 2, which is loosely inserted into a holder 3. The holder 3 surrounds the filter holder 2 as a ring and is supported by posts 4, which are fixed to a bottom 5 or a base. A vessel 6, like a jug, is placed on the bottom 5 and has an opening on the top for filling with brewed coffee.

On the filter holder 2, a housing 7 with a drain 11 is located in the lower area, through which the prepared coffee can flow out. An actuating element 8 in the form of a rotary knob is provided on the housing 7, by means of which a drain on the filter holder 2 can be opened and closed manually.

Figure 2:
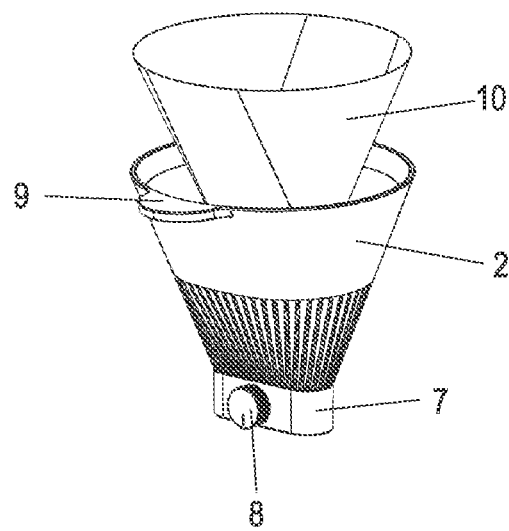
FIG. 2 is an exploded view of the filter holder of FIG. 1.

FIG. 2 shows the filter holder 2 with a filter insert 10, in particular a filter paper insert into which ground coffee can be poured. The filter holder 2 also has a protruding handle section 9, with which the filter holder 2 can be easily gripped and removed from the holder 3.

FIG. 3 shows the filter holder 2. The filter holder 2 comprises a substantially frustoconical receptacle for the filter insert 10 and, in the lower section, a housing 7 on which the actuating element 8 is rotatably mounted.

Figure 4A:
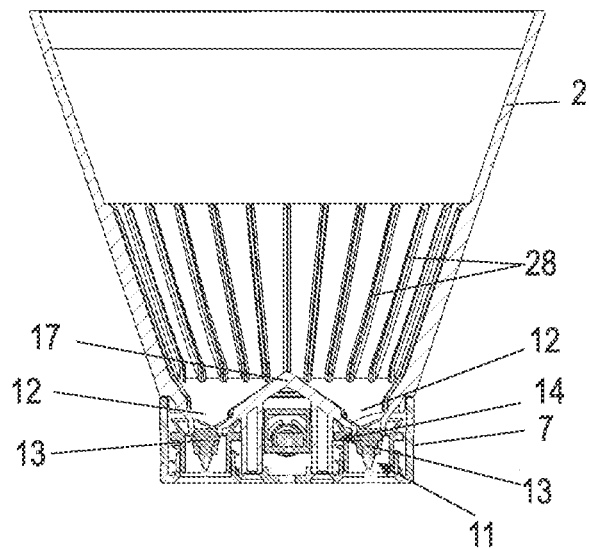
FIGS. 4A and 4B show two views of the filter holder of FIG. 3 in section, with and without a housing in a lower section, respectively.
Figure 4B:
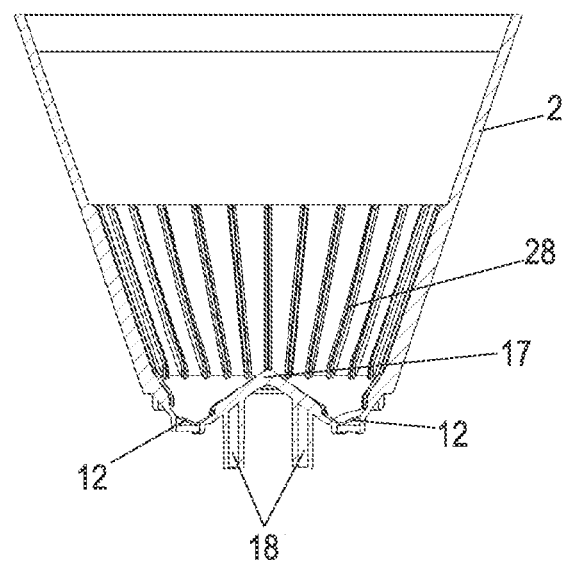

FIGS. 4A and 4B show a sectional view of the filter holder 2. In FIG. 4A, the filter holder 2 is fitted with the housing 7 in the lower section, on which a closure element 14 is provided to open and close a drain 11. The filter holder 2 has protruding ribs 28 on the inside, which ensure that the filter insert 10 is spaced from an outer wall of the filter holder 2. In the lower section, the filter holder 2 has two spaced drain holes 12, between which a protrusion 17 is formed. The filter holder 2 can optionally have a single drain hole 12 or more than two drain holes 12. Each drain hole 12 can be closed by a valve body 13.

To fix the housing 7 to the filter holder 2, sleeves 18 are molded below the protrusion 17, into which screws (not shown) can be screwed, which penetrate a housing base 19 (see FIG. 5A) to fix the housing 7 permanently to the filter holder 2.

Figure 5A:
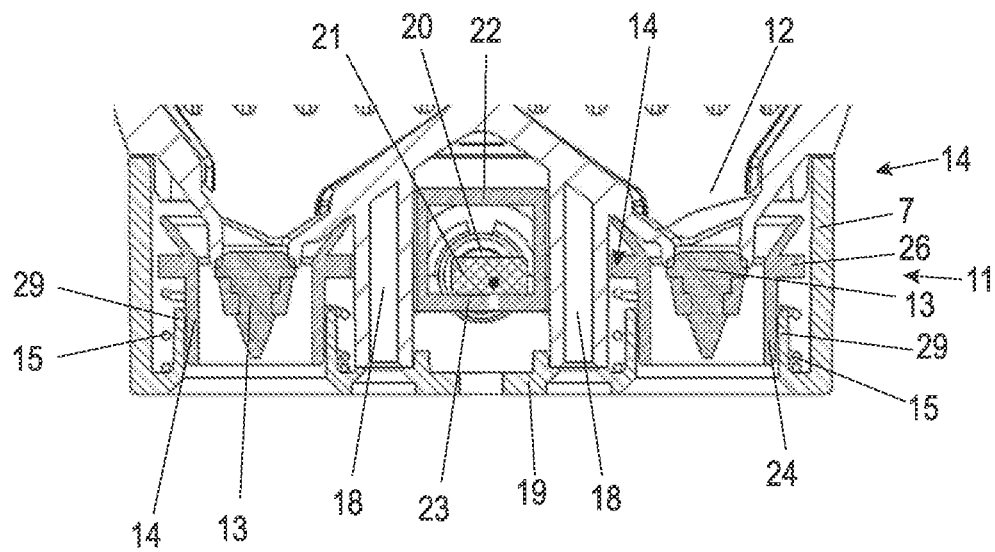
FIGS. 5A and 5B show two detailed views of the filter holder of FIG. 4 in the area of the closing device.
Figure 5B:
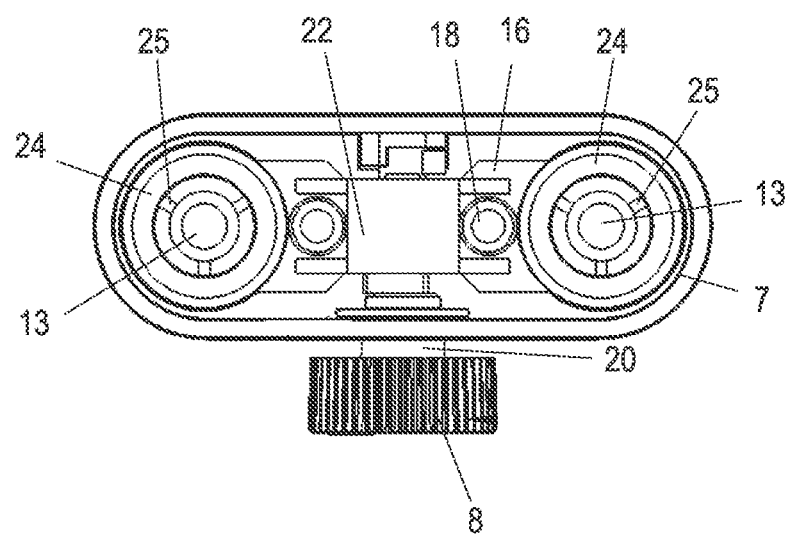

FIGS. 5A and 5B show the closure element 14 of filter holder 2 in detail. The closure element 14 on the drain 11 comprises a valve body 13 at each drain hole 12, which is connected to a sleeve 24 via webs 25. The sleeve 24 is connected via a connecting element 16 to a box 22, which is coupled to the actuating element 8. Each sleeve 24 has an outwardly protruding edge 26 on which a spring 15 is supported, which is supported on the opposite side on a base of the housing 7. Thus, each spring 15 pre-tensions the sleeve 24 upwards, so that the valve body 13 made of elastic material is also pressed against the edge at the drain hole 12. To guide the movement of the sleeves 24, guide means 29 in the form of guide sleeves are provided on the housing 7, which ensure that the sleeves 24 can essentially only be moved in the vertical direction.

FIGS. 5A and 5B show the valve bodies 13 in the closed position where they rest against the edge of the drain holes 12. The springs 15 push the sleeves 24 and thus the connecting element 16 upwards. In the box 22 there is a turning part 21 with a rectangular cross-section, which rests with its long side against a base 23 of the box 22. The turning part 21 is pivotally mounted on an axis 20, on which the actuating element 8 is located, as shown in FIG. 5B.

Figure 6A:
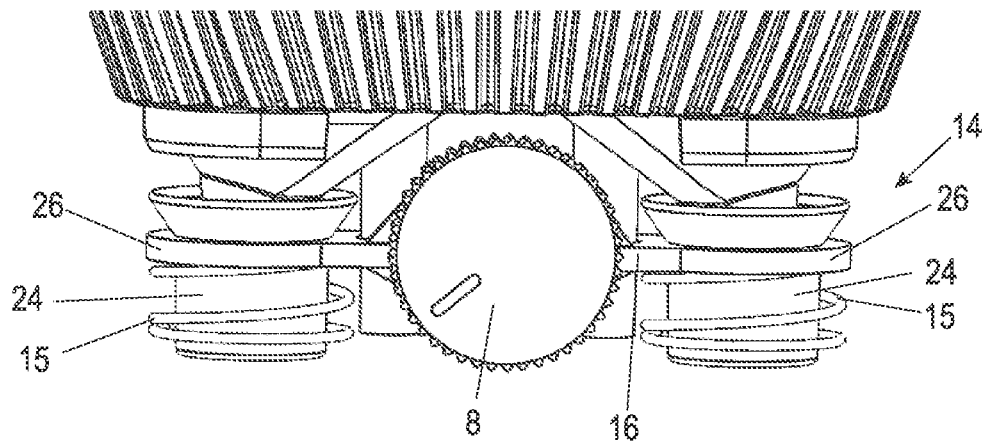
FIGS. 6A to 6C show multiple views of the filter holder locking device without the surrounding housing.
Figure 6B:
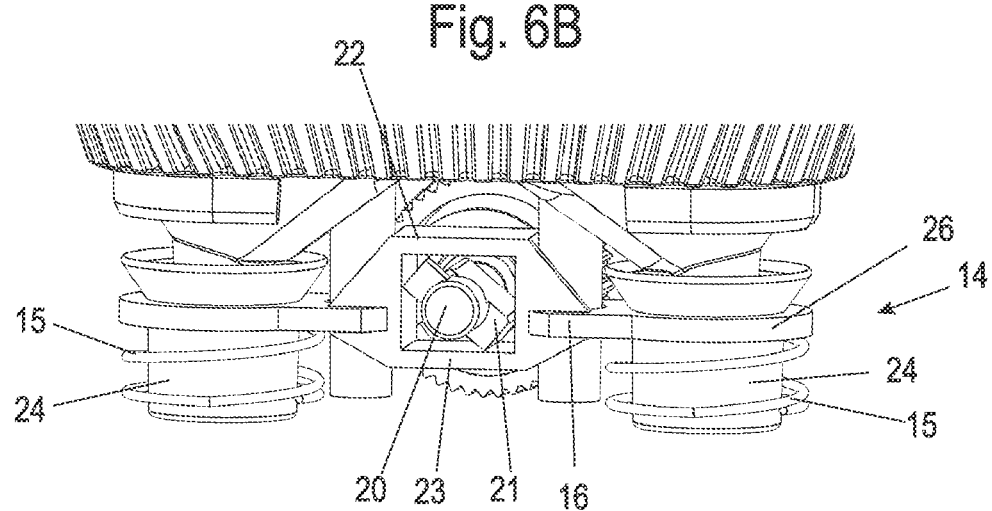
Figure 6C:
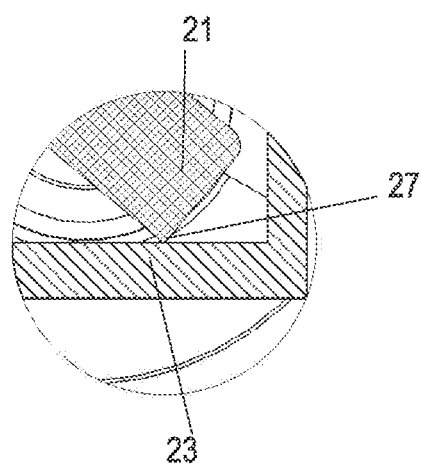

If the closure element 14 on the filter holder 2 is to be opened, the actuating element 8 can be turned as shown in FIGS. 6A to 6C. Actuator 8 has been adjusted by about 45° according to the markings, as a result of which the rectangular shaped turning part 21 has also been turned so that an edge 27 on turning part 21 presses the base 23 on box 22 downwards against the force of springs 15. As a result, the box 22 together with the connecting element 16 and the valve bodies 13 move downwards against the force of the springs 15.

Figure 7A:
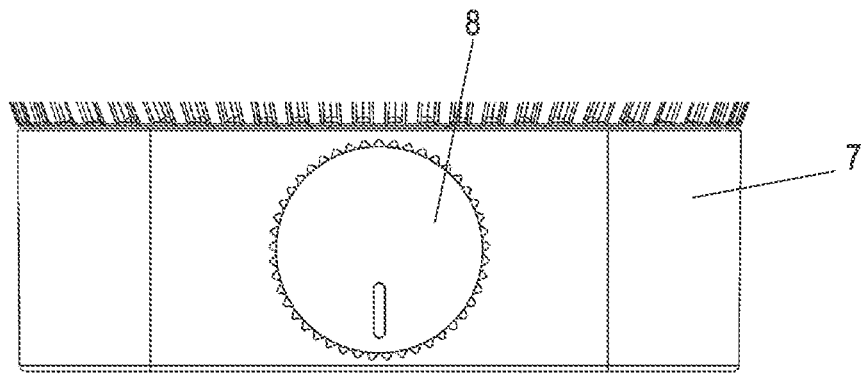
FIGS. 7A and 7B two views of the filter holder of FIG. 4 in an open position.
Figure 7B:
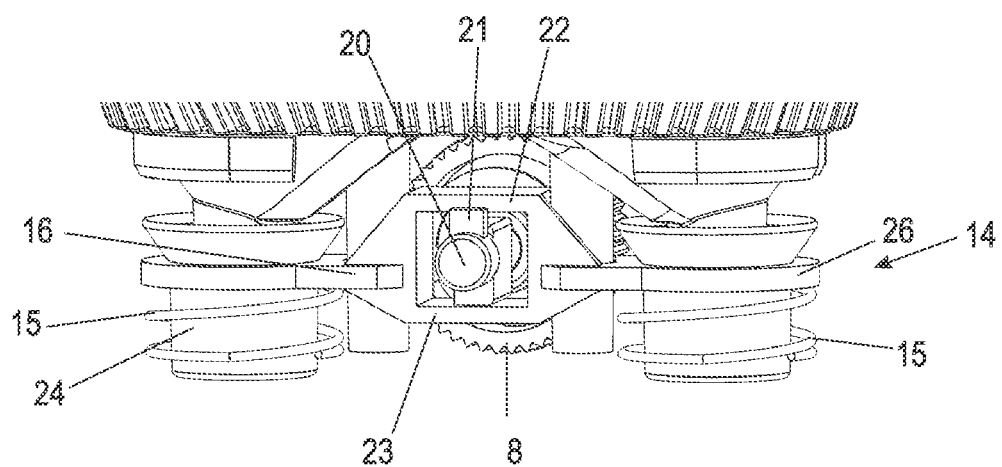

If the actuating element 8 is now turned further, as shown in FIGS. 7A and 7B, an opening position is reached in which the turning part 21 is locked in place. The edge 27 is positioned on the base 23 in such a way that a narrow side of the turning part 21, which is rectangular in cross-section, comes to rest on the base 23. Via the turning part 21, the connecting element 16 is thus located a small distance lower than in the closed position, as a result of which the valve bodies 13 have also been moved downwards and the drain holes 12 open. Coffee can now be brewed manually or automatically in this position and is then collected in the vessel 6. After brewing, the user can turn the actuating element 8 back from the position shown in FIG. 7A, which will also move the valve bodies 13 back to the position shown in FIG. 5A.

Figure 8A:
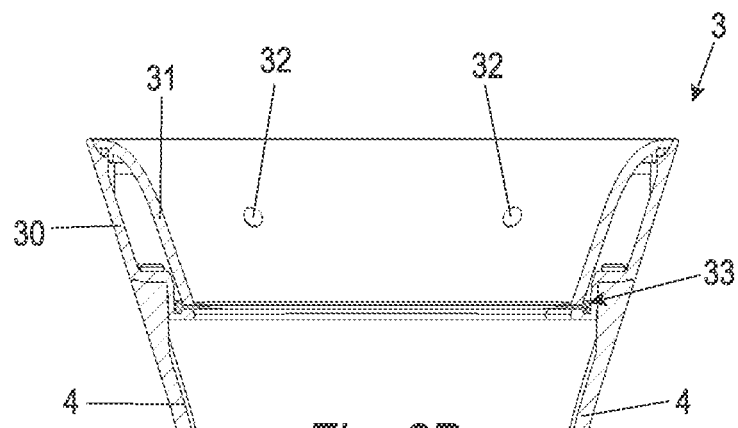
FIGS. 8A to 8C show multiple views of the holder of the device of FIG. 1.
Figure 8B:
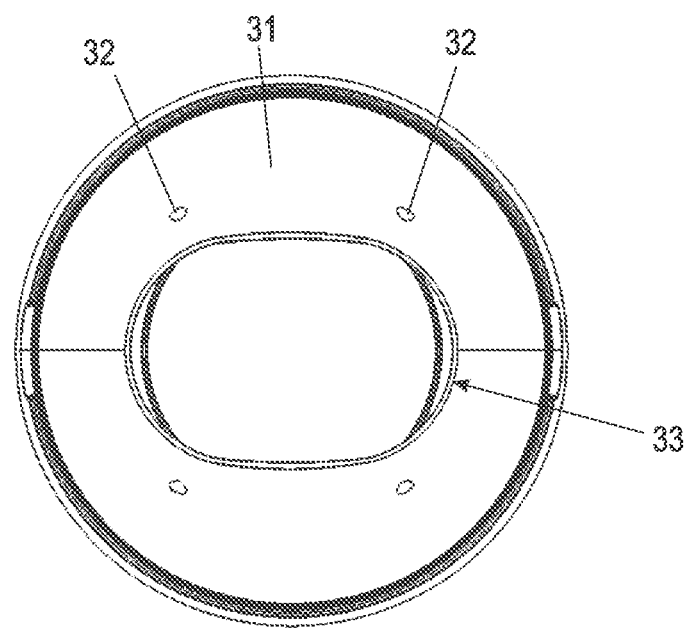
Figure 8C:
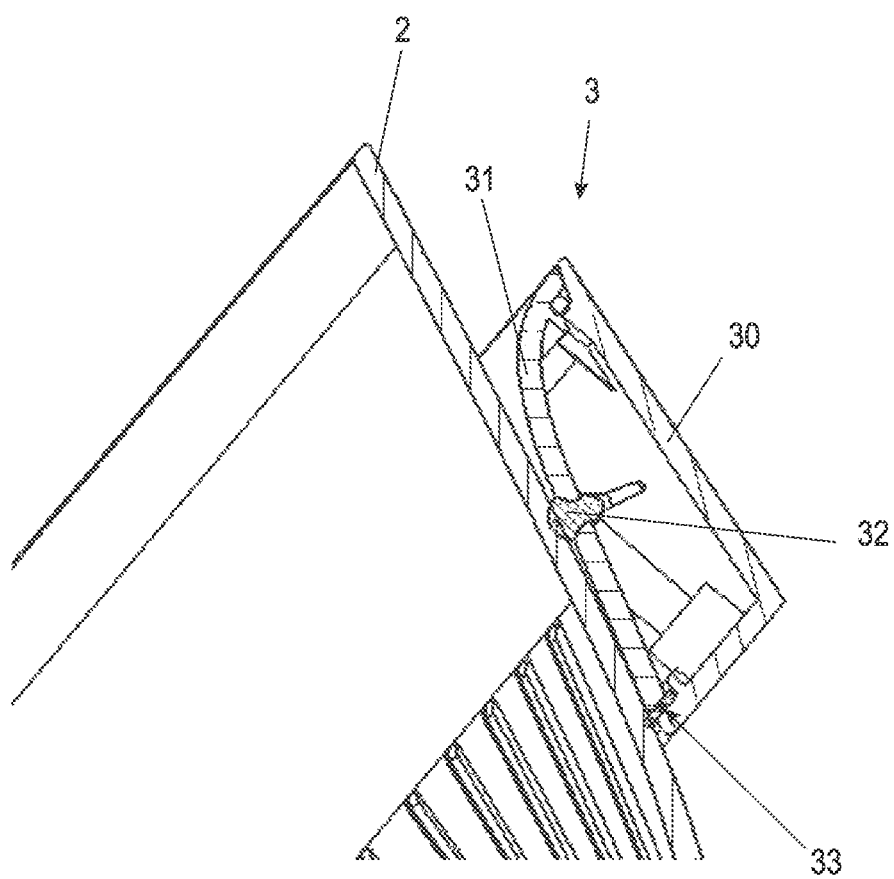

FIGS. 8A to 8C show the holder 3 of the device 1. The holder 3 annularly surrounds the filter holder 2, wherein the holder 3 having outer support elements 30 supported on the posts 4, and an inner insert 31 which spreads upward. Several elastic support elements 32 are arranged on the insert 31, distributed around the circumference, which penetrate the insert 31. An elastic support ring 33 is inserted at the lower edge of the holder 3. As a result, the filter holder 2 with its walls does not lie directly against the insert 31, but against the elastic support elements 32 and the elastic support ring 33, which ensures low noise emission and secure centering of the filter holder above the vessel 6.

The elastic support elements 32 can be designed as plugs, as shown in FIG. 8C, which are inserted into openings on the insert 31. Instead of the two-piece construction shown with support element 30 and insert 31, holder 3 can also be of a one-piece design.

It will be understood that the above description of the present invention is susceptible to various modifications, changes and adaptations, and that the same are intended to be comprehended within the meaning and range of equivalents of the appended claims.

The invention claimed is:

1. A device for preparing coffee, in particular by manual brewing, comprising:
a filter holder for receiving a filter insert with ground coffee;
a holder in which the filter holder is inserted;

a vessel arranged under the filter holder into which the brewed coffee can be filled;

a drain arranged on the filter holder and including two spaced apart drain holes arranged in the drain;

a closure element arranged on the drain for opening and closing the drain;

an actuating element arranged on the filter holder and connected to move the closure element between an open position and a closed position independently of the vessel; and wherein the closure element comprises two valve bodies each arranged to close one of the two drain holes via the actuating element.

2. The device according to claim 1, wherein the filter holder includes a housing in a lower section of the filter holder, and the actuating element is displaceably or pivotably mounted on the housing.

3. The device according to claim 1, wherein the closure element is lockable in an open position and a closed position.

4. The device according to claim 1, further including a spring arranged to pretension the closure element into a closed position.

5. The device according to claim 1, wherein the closure element comprises a connecting element coupled to the two valve bodies to simultaneously open and close the two valve bodies.

6. The device according to claim 5, wherein the drain includes a spring and the connecting element has a web which is displaceable by the actuating element against the force of the spring.

7. The device according to claim 5, wherein the connecting element includes two integrally formed sleeves each arranged under one of the two drain holes on the filter holder.

8. The device according to claim 7, wherein the filter holder includes a housing in a lower section of the filter holder and the housing includes guide means for guiding each of the two sleeves.

9. The device according to claim 1, wherein the actuating element comprises a rotary knob.

10. The device according to claim 9, further including an eccentric or a projecting cam connected to the rotary knob and arranged on a rotational axis of the rotary knob for moving the closure element.

11. A Device for preparing coffee, in particular by manual brewing, comprising:

a filter holder for receiving a filter insert with ground coffee;

a ring-shaped holder that surrounds the filter holder and has elastic support elements to support the filter holder;

a vessel arranged under the filter holder onto which the brewed coffee can be filled;

a drain arranged on the filter holder;

a closure element arranged on the drain for opening and closing the drain; and an actuating element arranged on the filter holder and connected to move the closure element between an open position and a closed position independently of the vessel.

12. The device according to claim 11, further including an elastic support ring arranged in the holder to hold the filter holder centered in the holder.

* * * * *